(12) United States Patent
Toback

(10) Patent No.: US 8,342,848 B2
(45) Date of Patent: Jan. 1, 2013

(54) APPARATUS FOR DEVELOPING AND/OR AUGMENTING COMMUNICATION SKILLS

(76) Inventor: Patricia Anne Toback, Stony Brook, NY (US)

(*) Notice: Subject to any disclaimer, the term of this patent is extended or adjusted under 35 U.S.C. 154(b) by 329 days.

(21) Appl. No.: 12/626,199

(22) Filed: Nov. 25, 2009

(65) Prior Publication Data

US 2011/0123966 A1      May 26, 2011

(51) Int. Cl.
G09B 19/00 (2006.01)
(52) U.S. Cl. .................................................. 434/156
(58) Field of Classification Search .................. 434/156, 434/157, 168, 172, 175, 428, 430, 167; 40/124.04, 40/124.12, 124.14, 618, 621; 248/441.1, 248/460
See application file for complete search history.

(56) References Cited

U.S. PATENT DOCUMENTS

| | | | | |
|---|---|---|---|---|
| 3,081,560 A | * | 3/1963 | Campo Agud Joaquin | 434/157 |
| 3,599,925 A | * | 8/1971 | Dubler | 248/352 |
| 5,704,147 A | * | 1/1998 | Rellinger | 40/621 |
| 5,720,464 A | * | 2/1998 | Meinscher et al. | 248/447 |
| 5,855,351 A | * | 1/1999 | Cziraky et al. | 248/451 |
| 6,142,786 A | * | 11/2000 | Culberson et al. | 434/258 |
| 6,159,014 A | | 12/2000 | Jenkins et al. | |
| 6,412,743 B1 | * | 7/2002 | Fell | 248/441.1 |
| 6,449,460 B2 | | 9/2002 | Logan | |
| 6,626,675 B1 | * | 9/2003 | Webber | 434/156 |
| 6,682,352 B2 | * | 1/2004 | Lopez | 434/408 |
| 6,724,298 B2 | | 4/2004 | Smith | |
| 6,890,180 B2 | * | 5/2005 | Sterns et al. | 434/157 |
| 7,220,125 B1 | * | 5/2007 | Blansett | 434/185 |
| 7,694,932 B1 | * | 4/2010 | Ngan | 248/461 |
| 2001/0046661 A1 | | 11/2001 | Shorter | |
| 2002/0142271 A1 | | 10/2002 | Curtin | |
| 2006/0040240 A1 | | 2/2006 | Kopilevich | |
| 2008/0038698 A1 | | 2/2008 | Meissner et al. | |

* cited by examiner

Primary Examiner — Kurt Fernstrom
(74) Attorney, Agent, or Firm — Carter, DeLuca, Farrell & Schmidt, LLP

(57) ABSTRACT

An apparatus for developing, promoting and/or augmenting communication skills includes an apparatus base dimensioned for positioning relative to a support. The apparatus base defines longitudinal, vertical and orthogonal axes, and a reference plane inclusive of the longitudinal and orthogonal axes. The apparatus base includes a top support surface arranged at a predetermined angle greater than 0 degrees relative to the reference plane. The top support surface has an article retaining element associated therewith. At least one icon containing article having communication media adapted for conveying information is releasably mounted to the article retaining element of the top support surface. The top support surface may be arranged at an angle ranging from about 10 degrees to about 60 degrees relative to the reference plane. In one embodiment, the top support surface is arranged at an angle of about 45 degrees relative to the reference plane.

17 Claims, 8 Drawing Sheets

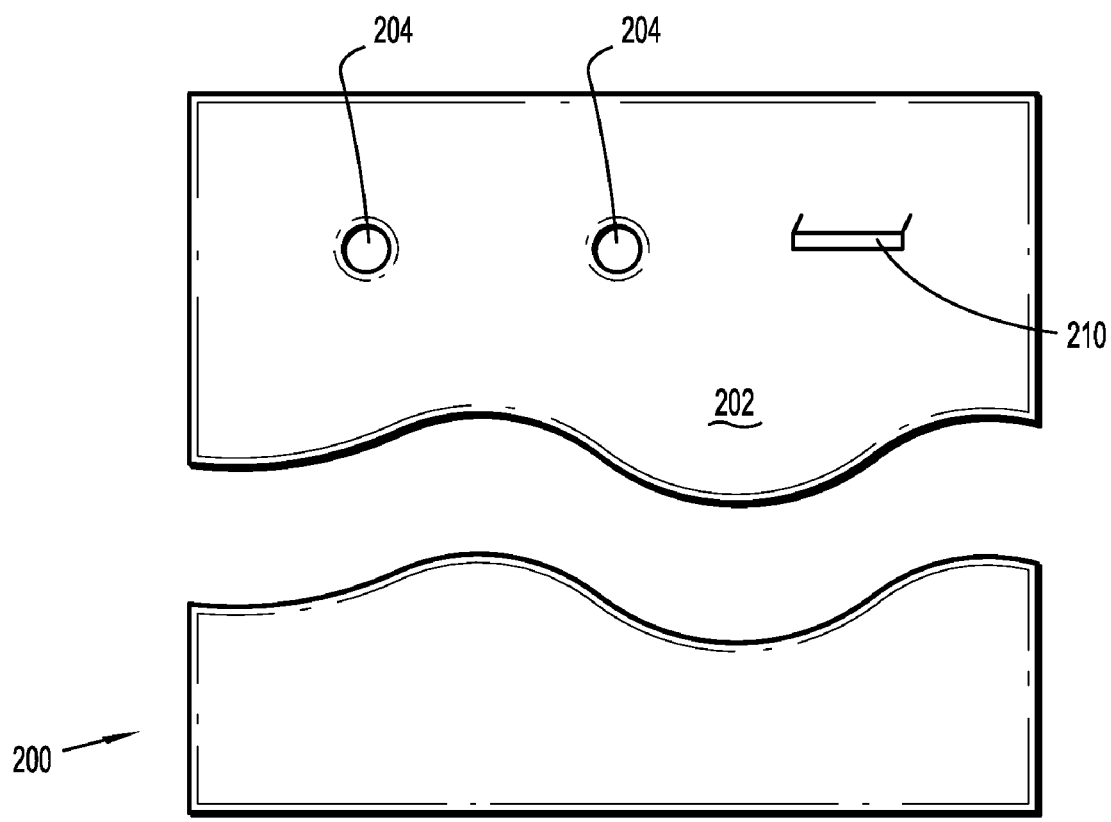
FIG. 8
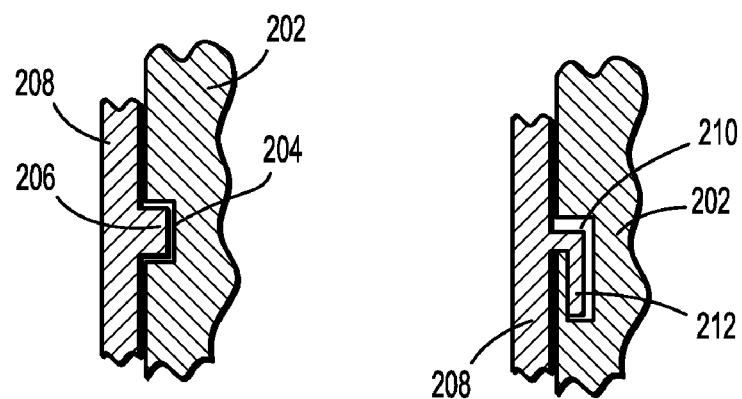
FIG. 9A      FIG. 9B

APPARATUS FOR DEVELOPING AND/OR AUGMENTING COMMUNICATION SKILLS

BACKGROUND

1. Technical Field

The present invention relates to a communication apparatus, and, in particular, relates to a communication apparatus for developing, promoting and/or augmenting communication skills in primarily non-verbal subjects.

2. Related Art

In recent years, the incidence of autism and other mental disabilities in children has increased to epidemic levels. Associated with these disabilities is a delay in communication skills including nonverbal, speech and language communicative capabilities. This inability or ineffectiveness of the child's communication impedes his/her development, effects goal setting and increases frustration on behalf of the child and the clinician or therapist.

SUMMARY

Accordingly, the present invention is directed to an apparatus for developing, promoting and/or augmenting communication skills. The apparatus includes an apparatus base dimensioned for positioning relative to a support. The apparatus base defines longitudinal, vertical and orthogonal axes, and a reference plane inclusive of the longitudinal and orthogonal axes. The apparatus base includes a top support surface arranged at a predetermined angle greater than 0 degrees relative to the reference plane. The top support surface has an article retaining element associated therewith. At least one icon containing article having communication media adapted for conveying information is releasably mounted to the article retaining element of the top support surface. The top support surface may be arranged at an angle ranging from about 10 degrees to about 60 degrees relative to the reference plane. In one embodiment, the top support surface is arranged at an angle of about 45 degrees relative to the reference plane.

The top support surface may include first and second article retaining elements. The first and second article retaining elements are preferably spaced along the longitudinal axis. The top support surface may include first, second and third article retaining elements with the first, second and third article retaining elements being spaced along the longitudinal axis.

The article retaining element of the top support surface may include one of a hook and loop fastener, and the article may include the other of the hook and loop fastener. The hook and loop fasteners are adapted to cooperate to releasably retain the article to the top support surface.

The article retaining element of the top support surface may include a strip of the one of the hook and loop fastener. Alternatively, a plurality of the strips of the one of the hook and the loop fastener are disposed on the top support surface. The strips are spaced along the longitudinal axis.

In another alternate embodiment, the article retaining element of the top support surface of the apparatus base and the icon containing article include one of snap fasteners and tongue and groove mechanisms for releasably mounting the article to the top surface.

The apparatus base may include a rear support surface. The rear support surface may have an article retaining element associated therewith. The rear support surface may be arranged at a second predetermined angle relative to the reference plane. The second predetermined angle may be generally orthogonal to the reference plane, or, may range from about 60 degrees to about 90 degrees relative to the reference plane. The article retaining element of the rear support surface may include a strip of one a hoop and look fastener. Alternatively, the rear support surface may include first and second strips of either a hook or loop fastener.

The apparatus base may be generally compliant. A handle may be mounted to the apparatus base. The handle is adapted for manual engagement by the user.

BRIEF DESCRIPTION OF THE DRAWINGS

Embodiments of the present disclosure will be better appreciated by reference to the drawings wherein:

FIG. 8 is a partial top plan view of an alternate embodiment of the communication apparatus of FIG. 1; and FIGS. 9A-9B are rear plan views of alternate mechanisms for releasably securing the icon containing article to the communication apparatus of FIG. 8.

DETAILED DESCRIPTION OF THE EMBODIMENTS

The apparatus for developing or augmenting communication skills according to the present invention has application in various settings including clinical, school, residential, etc and may be used with any subject, patient or child experiencing difficulty in basic communicative skills regardless of the underlying medical condition.

In the following discussion, the term "subject" will include any person with a communication disability for which the apparatus is intended and the term "therapist" will include any teacher, therapist, clinician, parent or guardian involved in teaching or training the "subject" with the apparatus.

Figure 1:
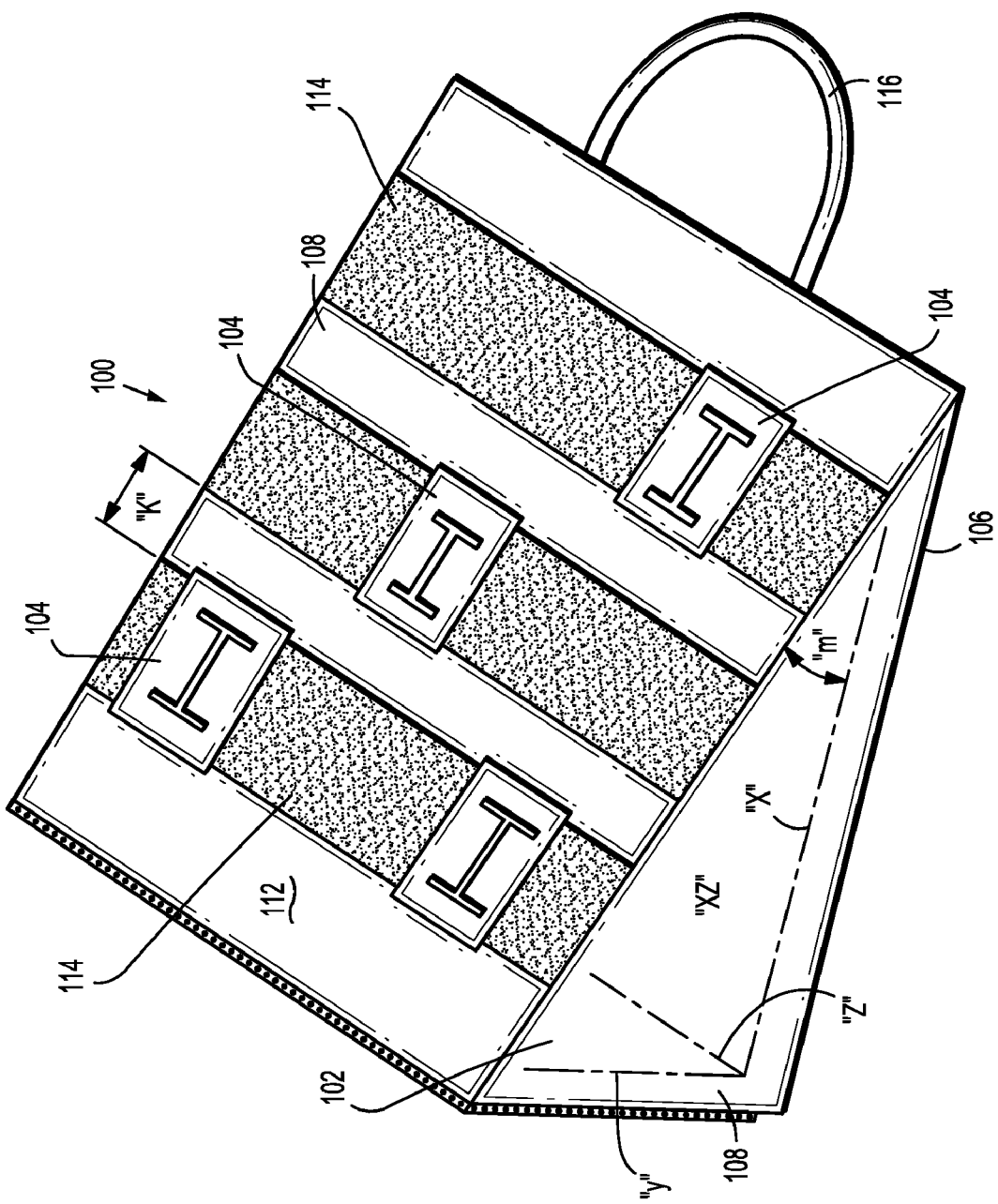
FIG. 1 is a perspective view of the communication apparatus in accordance with the principles of the present disclosure illustrating the apparatus base and several icon containing articles releasably mounted to the apparatus base.

With reference to FIG. 1, an apparatus in accordance with the principles of the present disclosure is illustrated, and designated generally as reference numeral 100. Apparatus 100 is intended to be a portable unit to be carried by the subject, but may be incorporated into a permanent structure such as a table, cabinet or the like.

Figure 2:
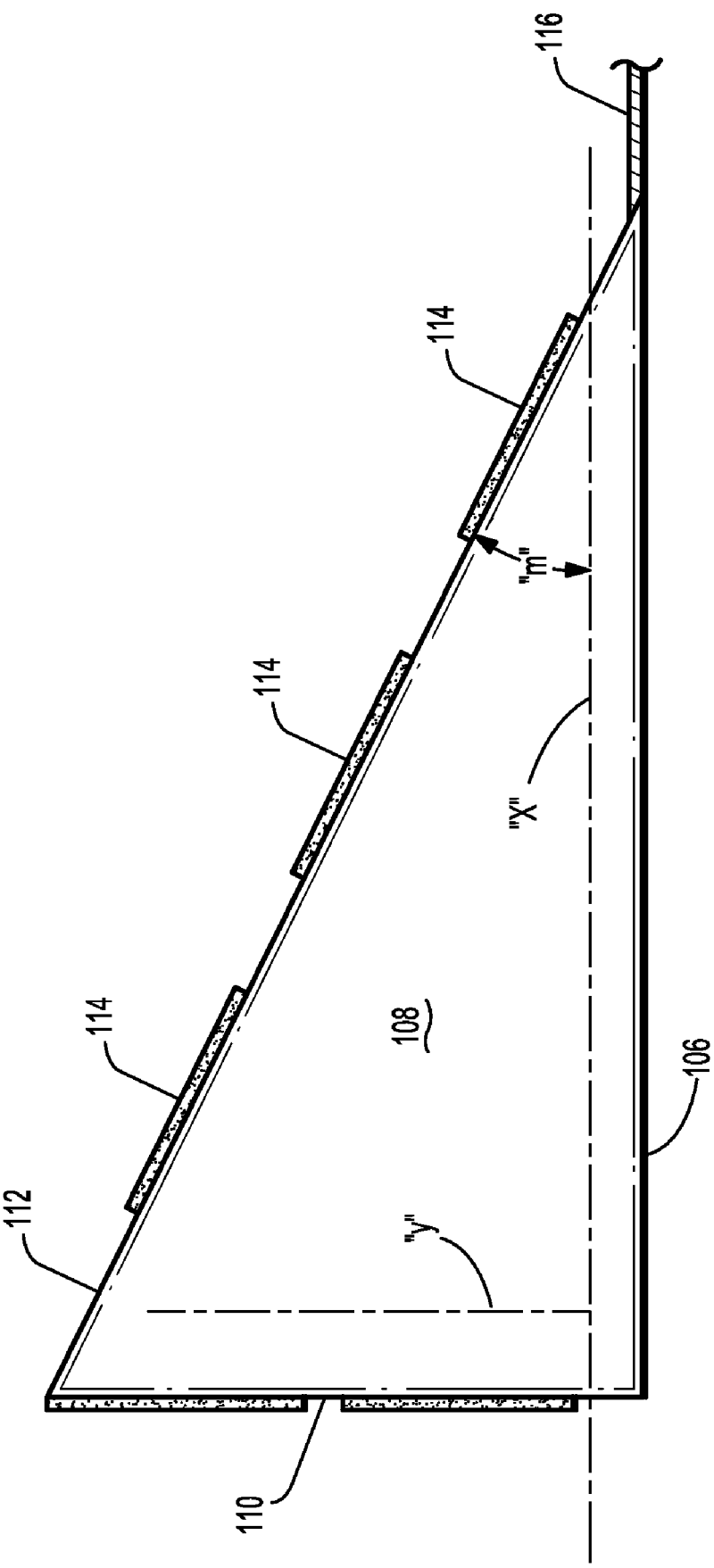
FIG. 2 is a side plan view of the communication apparatus of FIG. 1.
Figure 3:
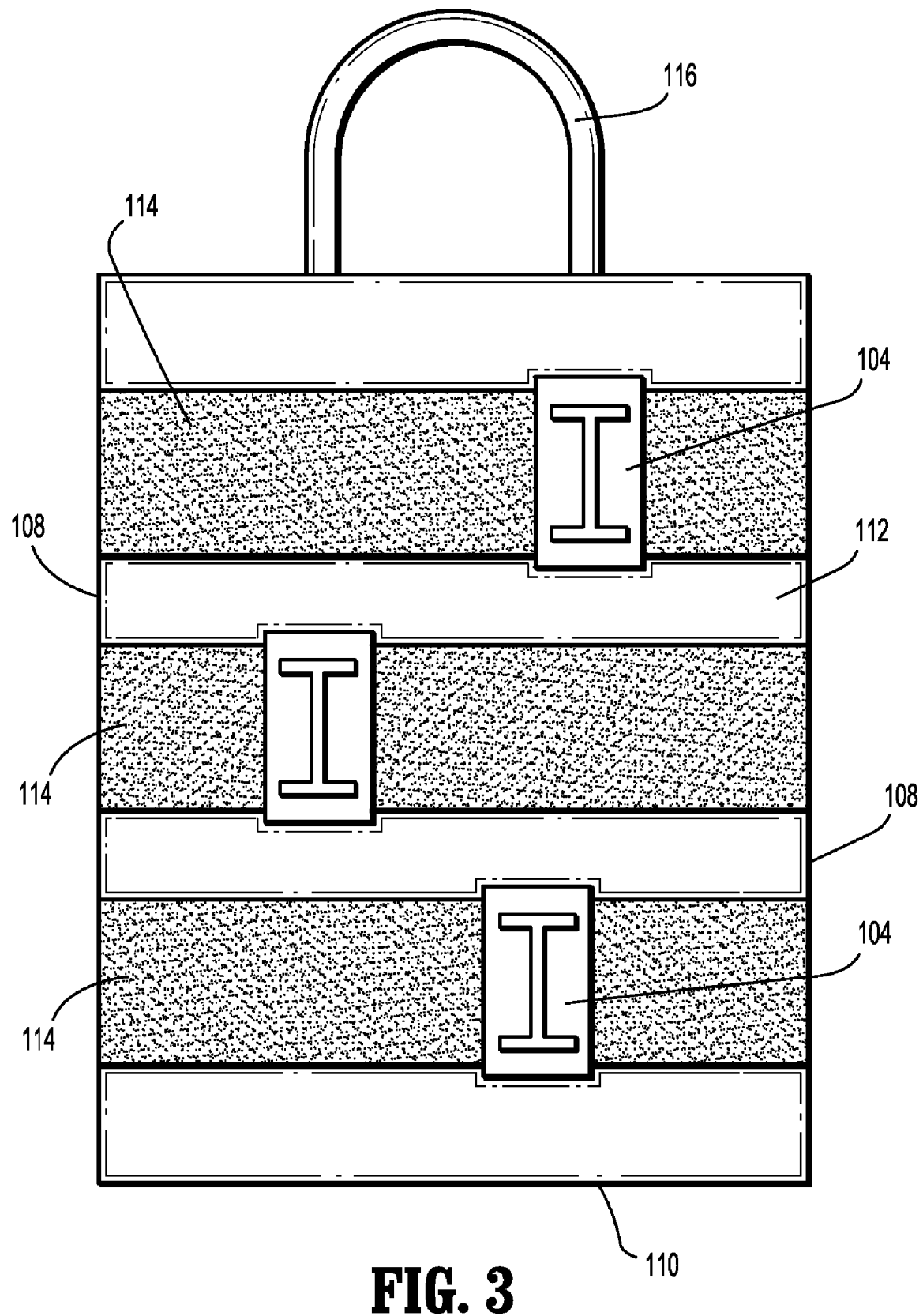
FIG. 3 is top plan view of the communication apparatus of FIGS. 1-2.

With reference now to FIGS. 1-2, apparatus 100 includes an apparatus base 102 and a plurality of icon containing articles 104 which are releasably mounted to the apparatus base 102. Apparatus base 102 may define a number of geometric shapes. In one embodiment, apparatus base 102 is generally wedge-shaped. Apparatus base 102 includes lower surface 106 which is positionable on a support such as a desk or table. Lower surface 106 may be substantially planar as shown. Apparatus base 102 defines longitudinal axis "x", vertical axis "y" and orthogonal axis "z". Longitudinal axis "x" and orthogonal axis "z" define reference plane "xz".

The icon containing articles 104 may be symbolic or pictorial representations of objects intended to be selected by the subject in response to prompting, questioning, and gesturing or the like by the therapist. Further, details of the icon containing articles 104 will be discussed in greater detail hereinbelow.

Referencing now to FIGS. 1-4 apparatus base 102 includes a plurality of surfaces, namely, first and second side surfaces 108, rear surface 110 and top surface 112. Top surface 112 and/or rear surface 110 is intended for releasably securing icon containing articles 104. In one embodiment, top surface 112 includes an article retaining mechanism for releasably securing the icon containing articles 104. One article retaining mechanism includes at least one fastener strip 114 which extends across at least a portion of the width or orthogonal length of the top support surface 112. In one embodiment, first, second and third fastener strips 114 are provided, and extend across the orthogonal length of top surface 112 to define first, second and third rows of fastener strips 114. Adjacent fastener strips 114 are preferably spaced a predetermined longitudinal distance or spacing "k" with respect to the longitudinal axis. In one embodiment, the spacing "k" may range from about 1 inch to about 2 inches. The spacing ensures that icon containing articles 104 are adequately separated from each other to thereby minimize confusion on behalf of the subject and facilitate the selection process.

In one embodiment, fastener strips 114 are one of the hook or loop fastener component of a hook or loop fastener mechanism such as a VELCRO™ fastener mechanism. The icon containing articles 104 have the other of the hook or loop fastener component on its rear surface. The hook and loop fastener mechanism associated with top surface 112 of apparatus base 102 and icon containing articles 104 permits releasable securement of the icon containing articles 104 for ready disposition and removal relative to the top surface 112.

In accordance with one aspect of the apparatus 100, top surface 112 is inclined relative to the reference plane "xz". The angle of inclination "m" may vary, but may range between about 30 degrees to about 60 degrees, and may be about 45 degrees relative to reference plane "xz". This orientation has proven to substantially increase the accuracy of selection of the appropriate icon containing articles 104 by the subject (when prompted by the clinician) by, e.g., providing a three dimensional backdrop or view of the icon containing articles 104. Specifically, the angle of inclination "m" presents top surface 112 and icon containing articles 104 at a spatial reference plane or an orientation which enhances visual tracking by the subject. In addition, the inclined or raised surface reduces the potential for improper seating posture which would otherwise affect the decision making capabilities of the subject, improves visual tracking, minimizing errors and reduces communicative frustration.

Figure 4:
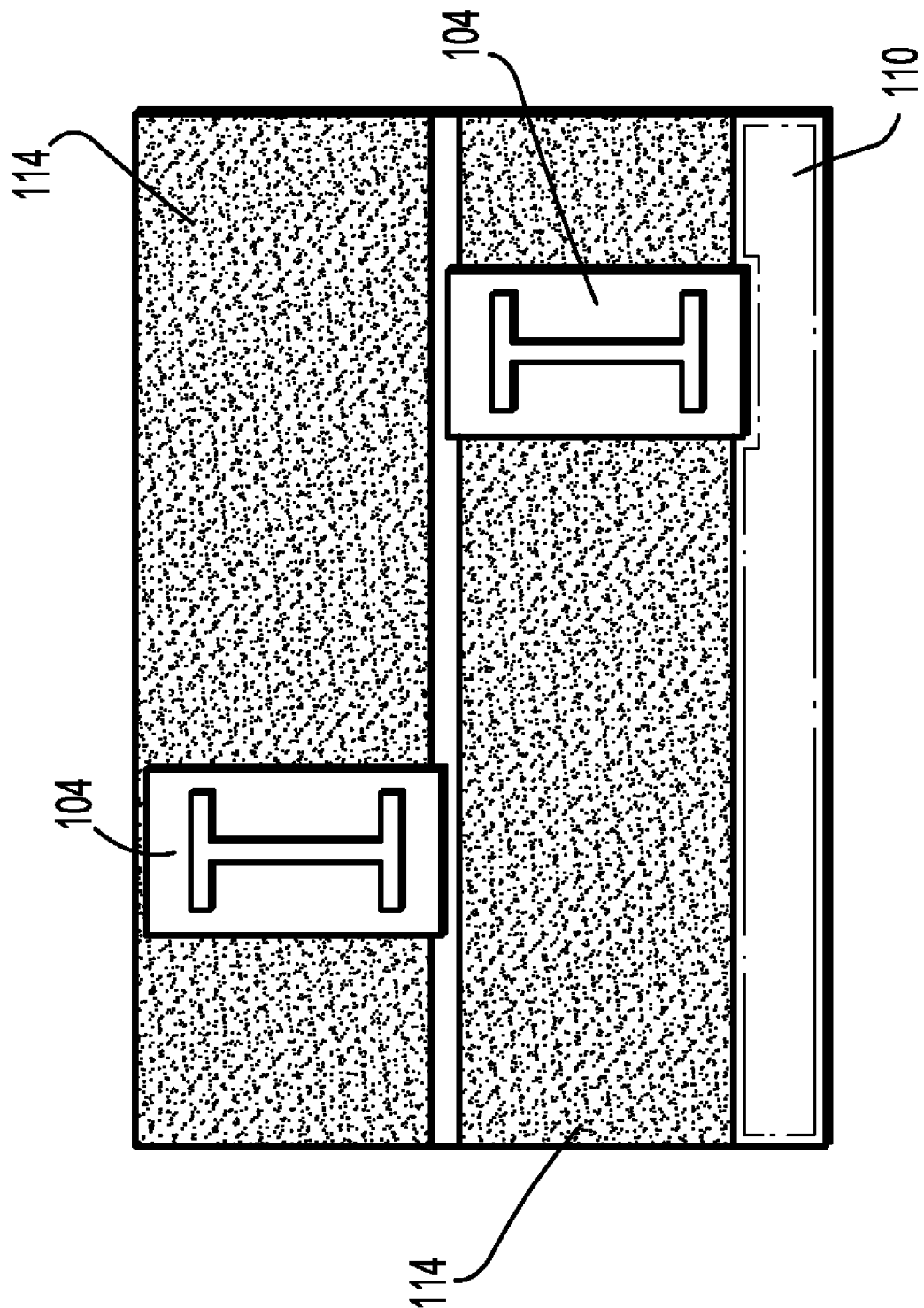
FIG. 4 is a rear plan view of the communication apparatus of FIGS. 1-3.
Figure 5:
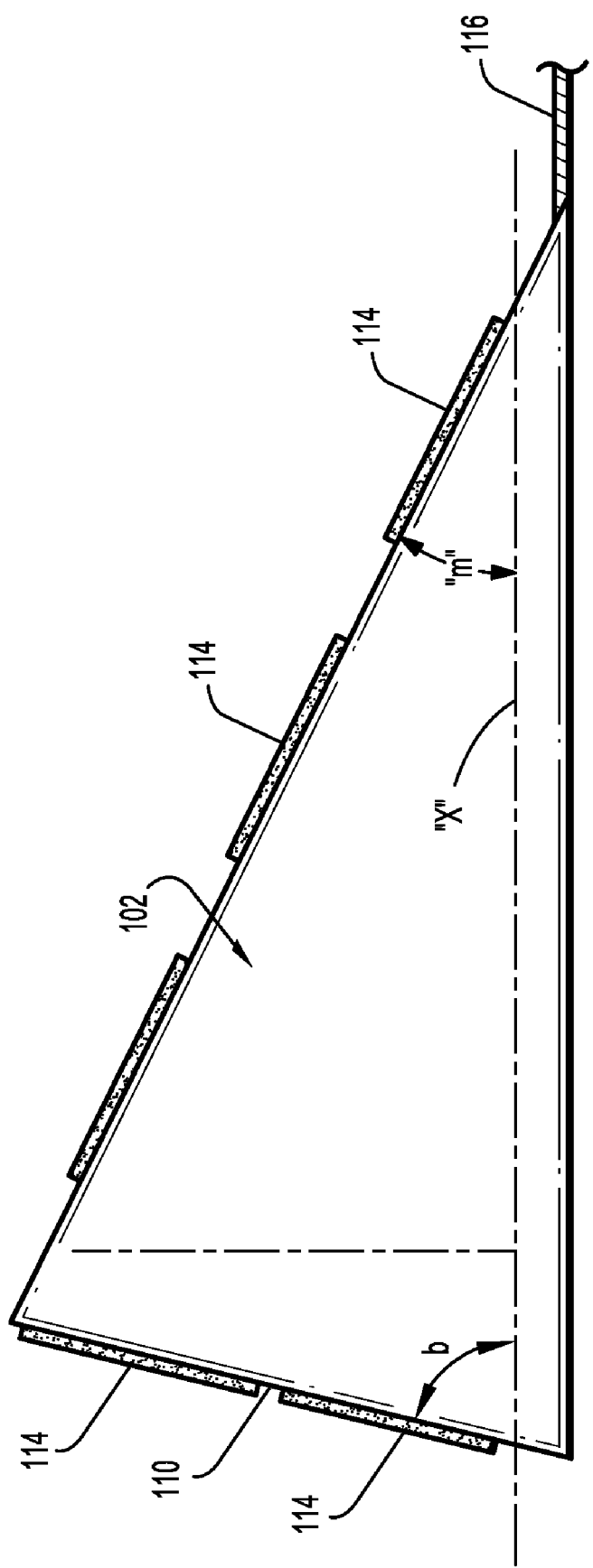
FIG. 5 is a side plan view of an alternate embodiment of the communication apparatus.
Figure 6A:
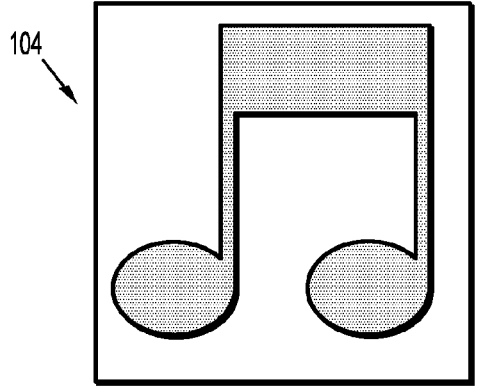
FIGS. 6A-6F are front plan views of icon containing articles of the communication apparatus.
Figure 6D:
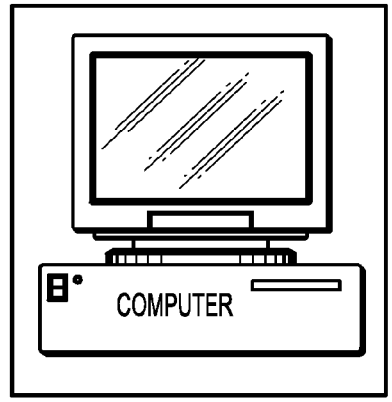
Figure 6B:
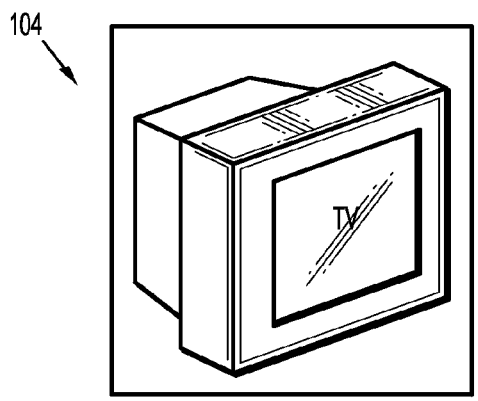
Figure 6E:
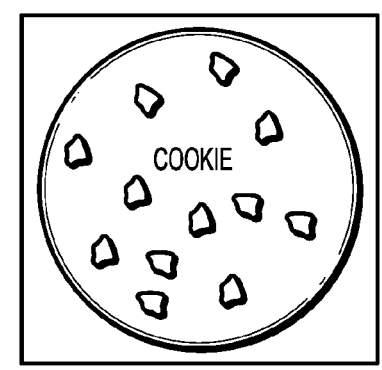
Figure 6C:
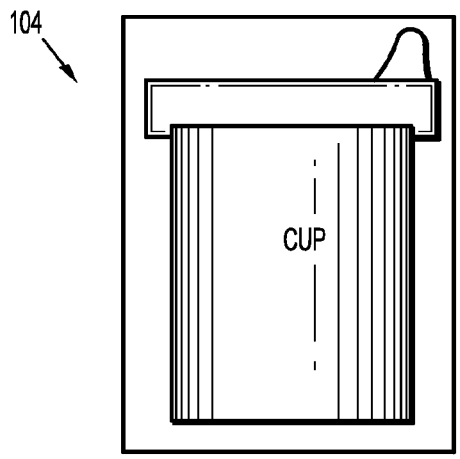
Figure 6F:
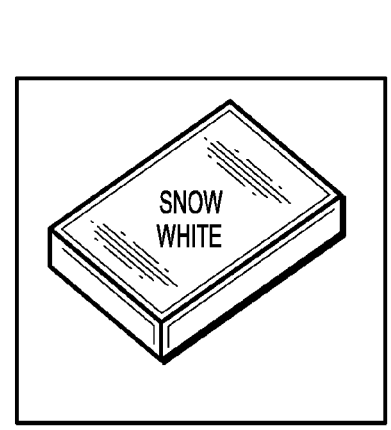

As best depicted in FIG. 4, rear surface 110 may also include an article retaining mechanism in the form of one or more fastener strips 114 which are substantially similar to the fastener strips 114 associated with top support surface 112. Two fastener strips 114 may be provided and may be either component of a hook and loop mechanism discussed hereinabove. Rear surface 110 permits the releasable attachment of the icon containing articles 104 in a manner similar to top support surface 112. Rear surface 110 may be substantially orthogonal or perpendicular to reference plane "xz". In the alternative as depicted in FIG. 5, rear surface 110 may be in oblique relation to reference plane "xz". In one embodiment, rear surface 110 is arranged at an angle "b" ranging from about 60° to about 90°, or about 75°. This orientation proves beneficial by raising or providing a three dimensional spatial reference plane conducive to article tracking when the subject is standing during the training session.

Apparatus base 102 may be fabricated from a number of materials. In one embodiment, apparatus base 102 is fabricated from a lightweight conformable material such as a sponge or foam structure encapsulated in an outer casing or cover made from a coated vinyl, pleather, plastic or the like. In one embodiment, the cover is fabricated from Naugahyde™ a product of Uniroyal Engineering Products LLC. Apparatus base 102 may further include handle 116 adapted for engagement by the subject to permit the subject to personally transport the apparatus base 102 between clinical rooms, the residence hall etc. In this manner, the apparatus 100 may be continuously used to reinforce the training received in each setting. Handle 116 may be fabricated from the same material of the cover.

FIGS. 6A-6E illustrate various embodiments of icon containing articles 104. Each icon containing article 104 may include a placard upon which an icon having a picture, drawing, photograph or graphical representation of an object is positioned or mounted. The icon containing articles 104 depicted in FIGS. 6A-6E include icons which are only representative of a vast variety of icons possibly incorporated within the articles 104.

Figure 7:
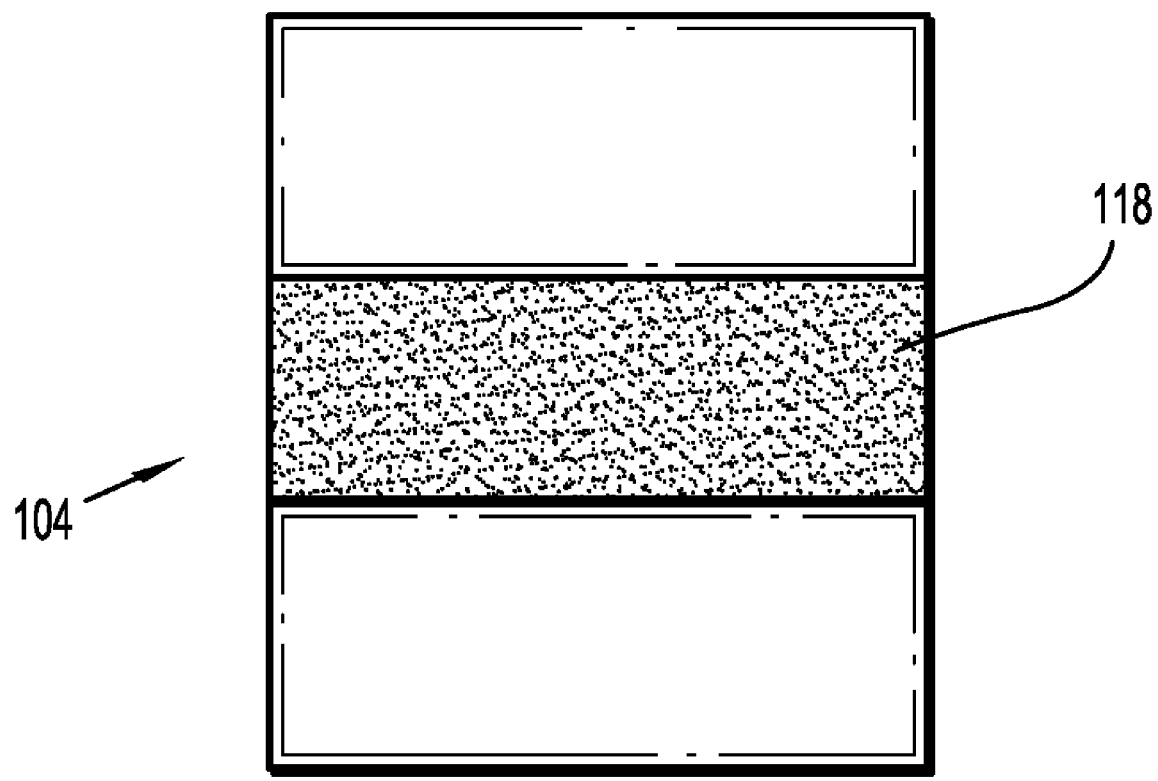
FIG. 7 is a rear plan view of an icon containing article.

FIG. 7 illustrates the rear side of icon containing article 104. As depicted, the rear side of each icon containing article incorporates a fastener strip 118 with the other of the hook or loop fastener component. Fastener strip 118 cooperates with fastener strip 114 on top surface 112 or rear surface 110 to releasably secure the icon containing article 104 to the appropriate surface 110, 112.

In use, the therapist will position a number of icon containing articles 104 on top surface 112 or rear surface 110, preferably, in spaced relation. The therapist will then request the subject to select the desired object represented by one of the icon containing articles 104. As indicated hereinabove, the inclined orientation of top surface 112 and/or of rear surface 110 will provide a three dimensional depth or reference plane which facilitates tracking of the articles 104 by the subject. Various different icon containing articles 102 may be readily released and secured to top surface 112 or rear surface 110 through the aforementioned releasable securing mechanism for further training purposes. Subsequent to the therapeutic session, the apparatus 100 may be transported by the subject to another physical setting.

FIG. 8 illustrates, in partial plan view, an alternate embodiment of communication apparatus 100. Apparatus 200 is substantially similar to the communication apparatus 100 described in the embodiment of FIGS. 1-7, but includes alternate mechanisms for releasably mounting the article containing icons. For example, top surface 202 of apparatus 200 may include one or more snap rings 204 which cooperate with a correspondingly dimensioned stud 206 mounted on the rear side of icon containing article 208 to releasably secure the article 208 to the top surface 202. FIG. 9A depicts this arrangement. Stud 206 may be secured to icon containing article 208 by any means including adhesives etc. As a further alternative, top surface 202 may include recess or groove 210 which receives a tongue 212 mounted on the rear surface of the icon containing article 208 to releasably secure the article 208 to the top surface 202 as depicted in FIG. 9B. Other means for releasably mounting icon containing articles 208 to top surface 202 are also envisioned including with the use of temporary adhesives or cements.

From the foregoing and with reference to the various drawings, those skilled in the art will appreciate that certain modifications can also be made to the present disclosure without departing from the scope of the same.

It will be understood that various modifications may be made to the embodiments disclosed herein. Therefore, the above description should not be construed as limiting, but merely as an exemplification of preferred embodiments. Those skilled in the art will envision other modifications within the scope and spirit of the present disclosure. Such modifications and variations are intended to come within the scope of the following claims.

What is claimed is:

1. An apparatus for developing, promoting and/or augmenting communication skills, which comprises:

an apparatus base comprised of a conformable material and an outer casing encapsulating the conformable material, the apparatus base being dimensioned for positioning relative to a support, the apparatus base defining a longitudinal, vertical and orthogonal axes and a reference plane inclusive of the longitudinal and orthogonal axes, the apparatus base including a top support surface arranged at a predetermined fixed angle which is greater than 0 degrees relative to the reference plane, the top support surface having a plurality of article retaining elements associated therewith, adjacent article retaining elements being arranged in longitudinal spaced relation, the apparatus base including a rear support surface arranged at a second predetermined fixed angle relative to the reference plane; and a plurality of icon containing articles each having communication media adapted for conveying information, the articles being releasably mounted to the article retaining elements of the top support surface, and being dimensioned and arranged whereby longitudinally adjacent articles are sufficiently longitudinally spaced to minimize potential of confusion on behalf of the subject and facilitate removal thereof relative to the top support surface.

2. The apparatus according to claim 1 wherein the predetermined fixed angle of the top support surface ranges from about 10 degrees to about 60 degrees relative to the reference plane.

3. The apparatus according to claim 1 wherein the predetermined fixed angle of the top support surface is about 45 degrees relative to the reference plane.

4. The apparatus according to claim 1 wherein the top support surface includes first, second and third article retaining elements, the first, second and third article retaining elements being longitudinally spaced along the longitudinal axis.

5. The apparatus according to claim 1 wherein each of the article retaining elements of the top support surface includes one of a hook and loop fastener, and each of the articles includes the other of the hook and loop fastener, the hook and loop fasteners adapted to cooperate to releasably retain the articles to the support surface.

6. The apparatus according to claim 5 wherein the article retaining elements of the top support surface include a plurality of strips of one of the hook and the loop fastener on the top support surface, the strips being longitudinally spaced along the longitudinal axis.

7. The apparatus according to claim 6 wherein the rear support surface has an article retaining element associated therewith.

8. The apparatus according to claim 7 including a plurality of article retaining elements on the rear support surface, and being dimensioned and arranged whereby adjacent articles of the article retaining elements are sufficiently spaced to minimize potential of confusion on behalf of the subject and facilitate removal thereof relative to the rear support surface.

9. The apparatus according to claim 7 wherein the second predetermined angle is generally orthogonal to the reference plane.

10. The apparatus according to claim 7 wherein the second predetermined angle ranges from about 60 degrees to about 90 degrees relative to the reference plane.

11. The apparatus according to claim 7 wherein the article retaining element of the rear support surface includes a strip of one a hoop and look fastener.

12. The apparatus according to claim 11 wherein the rear support surface includes first and second strips of either a hook or loop fastener.

13. The apparatus according to claim 1 including a handle, the handle adapted for manual engagement by the user.

14. The apparatus according to claim 13 wherein the handle depends outwardly from a perimeter of the apparatus base.

15. The apparatus according to claim 1 wherein the article retaining elements of the top support surface of the apparatus base and the icon containing articles include one of snap fasteners and tongue and groove mechanisms for releasably mounting the articles to the top surface.

16. The apparatus according to claim 1 wherein the conformable material is one of a foam or sponge material.

17. The apparatus according to claim 1 wherein the apparatus base is generally wedge-shaped.

* * * * *